United States Patent [19]
Petit

[11] Patent Number: 6,093,994
[45] Date of Patent: Jul. 25, 2000

[54] TRAVELING-WAVE PIEZOELECTRIC MOTOR

[75] Inventor: Lionel Petit, Caluire Et Cuire, France

[73] Assignee: Figest B.V., Netherlands

[21] Appl. No.: 09/213,664

[22] Filed: Dec. 17, 1998

[30] Foreign Application Priority Data

Jan. 16, 1998 [FR] France .................................. 98 00438

[51] Int. Cl.[7] .................................................. H01L 41/08
[52] U.S. Cl. ............................... 310/323.04; 310/323.06; 310/323.03
[58] Field of Search ................. 310/323.02, 323.03, 310/323.04, 323.05, 323.06, 321, 328

[56] References Cited

U.S. PATENT DOCUMENTS 5,719,462 2/1998 Takagi ............................ 310/323.04 X
5,726,519 3/1998 Gonnard et al. .................... 310/323.04

FOREIGN PATENT DOCUMENTS 2709214 2/1995 France .
2734105 11/1996 France .
0032771 2/1990 Japan ................................. 310/323.06

*Primary Examiner*—Mark O. Budd
*Attorney, Agent, or Firm*—Robert F. I. Conte; Lee, Mann, Smith, McWilliams, Sweeney & Ohlson

[57] ABSTRACT

A traveling wave piezoelectric motor having essentially a stator (1) in the form of an annular plate PLANE, the stator connected to two groups of cylindrical polarized ceramic piezoelectric elements (2, 3, 4) and excited by an alternating current with a phase shift of 90 degrees between the groups so as to generate a deformation in the form of a traveling wave at the surface of the stator, and of a rotor in the form of a disk. The piezoelectric elements are connected to the stator by the intermediary of an auxiliary coupling piece (5, 6, 7) in the form of a truncated segment and in permanent contact with the stator by their small-section extremity.

2 Claims, 1 Drawing Sheet

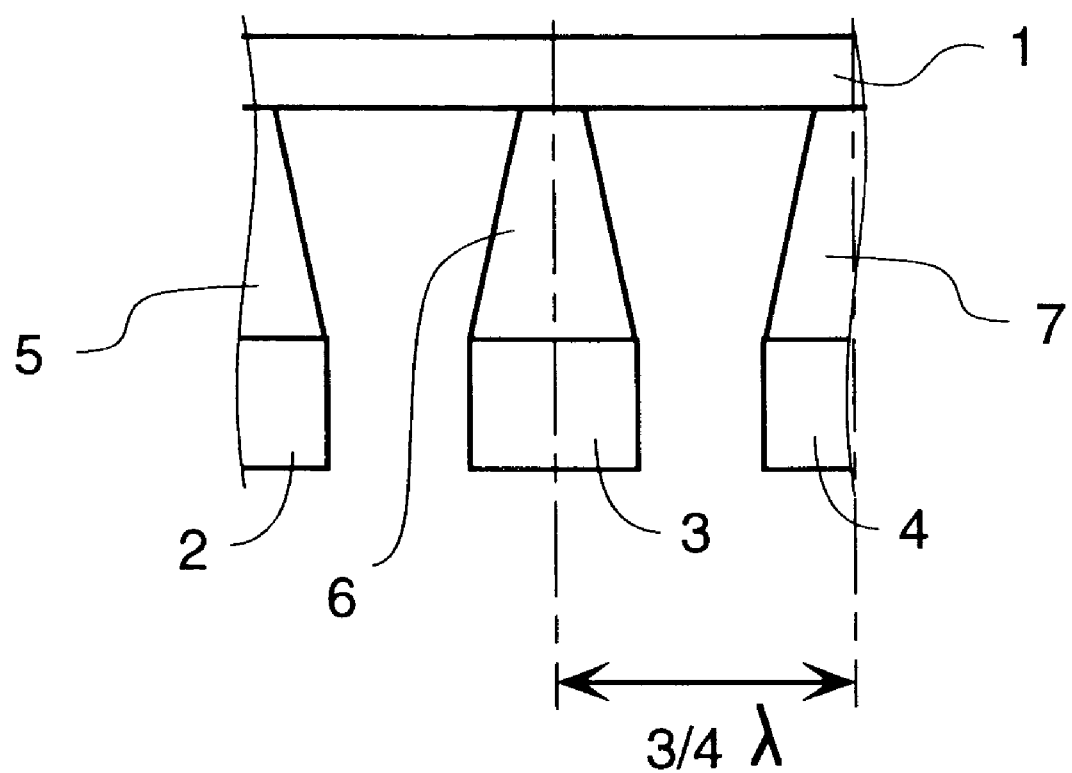

TRAVELING-WAVE PIEZOELECTRIC MOTOR

FIELD OF THE INVENTION

A traveling-wave piezoelectric motor is provided which essentially consists of a stator in the form of a flat annulus jointed to two groups of piezoelectric cylindrical elements of polarized ceramic which are distributed around the stator, presenting a polarization axis perpendicular to the plane of the stator and excited by an alternative current with a phase shift of 90 degrees between the groups so as to produce at the surface of the stator a traveling wave-like deformation, and of a rotor in the form of a disk held elastically in contact with the stator for the rotational driving thereof by the traveling wave produced on the stator.

PRIOR ART

One such motor is described in U.S. Pat. No. 5,648,696. In this motor, the piezoelectric elements are constituted of small rods. So as to suppress, to a great extent, a parasitic flexing of the rods due to wave-motion deformation of the stator which would prevent proper functioning of the stator and, consequently, of the motor, the bars are connected to the stator by a joint. In the operation of the motor, this joint is obtained by utilizing a stator having protuberances defining therebetween noticeably elliptical notches such that the protuberances present a constriction permitting their flexion, the constriction in this manner playing the role of a joint for the bars fixed to the extremity of these protuberances. These protuberances are obtained by removal of material from a metallic annulus such as can only be made by a cutting tool.

SUMMARY OF THE INVENTION

The present invention obtains the same result, that is to say, the preventing of parasitic flexion of the piezoelectric elements, by a less costly means.

To this end, the piezoelectric motor according to the invention is characterized in that the piezoelectric elements are connected to the stator by the intermediary of an intermediate coupling piece having the form of a truncated segment and in permanent contact with the stator by their small section extremity.

The truncated-segment rigid coupling pieces are able to be easily obtained from machining a metallic cylindrical bar on an automatic lathe. Such a process is very economical.

The coupling pieces shall be, according to preference, fixed by glue to the piezoelectric elements and to the stator, which may be advantageously constituted of a simple annular plate.

The two groups of the piezoelectric elements are disposed on the circumference of the stator such that the stationary waves generated by each of the groups are shifted by a spacing of $\lambda/4$, $\lambda$ being the wavelength of the stationary waves. The two groups of piezoelectric elements are, according topreference, embedded one in the other such that one encounters alternatively an element of the first group and an element of the second group. An advantage of this embedding is the driving of a uniform distribution of the piezoelectric elements on the circumference of the stator.

According to a preferred embodiment of the invention, the two groups of piezoelectric elements are embedded and the distance between the adjacent piezoelectric elements of different groups is equal to $3\lambda/4$.

This disposition does not change the shift between the stationary waves generated by each of the groups of piezoelectric elements, a shift which stays equal to $\lambda/4$, and the piezoelectric elements are again distributed in a uniform manner on the circumference of the stator. On the other hand, the increase of the distance between two consecutive piezoelectric elements, such as the bars, permits a noticeable increase in the diameter of the rods such that they exhibit an increased rigidity in flexion, which further contributes to the suppression of parasitic flexion.

BRIEF DESCRIPTION OF THE DRAWING

The appended figures represent, by way of an example, an embodiment of the invention.

FIG. 1 of the design is a partial, opened-out view of the stator with its piezoelectric exciters.

DESCRIPTION OF THE PREFERRED EMBODIMENTS

The stator has an annular plate 1 excited by cylindrical piezoelectric elements of polarized ceramic such as 2, 3, 4. The piezoelectric elements are connected to a stator 1 by the rigid truncated coupling pieces such as 5, 6 and 7, for example in "DURAL". These truncated pieces have a base of the same diameter as the diameter of the piezoelectric elements by which they are glued to the piezoelectric elements, and an extremity of a small diameter by which they are glued to the stator 1.

The piezoelectric elements are distributed in two groups, embedded one with the other, such that the piezoelectric elements 2 and 4 belong to one of the groups and the piezoelectric elements 3 belong to the other group. The distance between two adjacent piezoelectric elements is equal to $3\lambda/4$, $\lambda$ being the wave length of stationary waves generated by each of the groups of piezoelectric elements. These stationary waves are, as a consequence, shifted in space by $\lambda/4$.

The distance between two adjacent piezoelectric elements may of course be equal to $\lambda/4$ as in the prior art.

The stator shown, and in a general manner, the stator according to the invention, may be utilized for example in a motor which is represented in FIG. 5 of U.S. Pat. No. 5,648,696.

What is claimed is:

1. A traveling-wave piezoelectric motor having essentially a stator (1) in the form of an annular plate, the stator connected to two groups of cylindrical polarized ceramic piezoelectric elements (2, 3, 4) uniformly distributed on the stator, presenting a polarization axis perpendicular to the plane of the stator and excited by an alternating current with a phase shift of 90 degrees between the groups so as to generate a deformation in the form of a traveling wave at the surface of the stator, and of a rotor in the form of a disk held elastically in contact with the stator for its rotational driving by the traveling-wave generated by the stator, characterized in that the piezoelectric elements are connected to the stator by the intermediary of an auxiliary coupling piece (5, 6, 7) in the form of a truncated segment and in permanent contact with the stator by their small-section extremity.

2. The motor according to claim 1, in which the two groups of piezoelectric elements are embedded, characterized in that the distance between two adjacent piezoelectric elements of different groups is equal to $3\lambda/4$.

* * * * *